United States Patent
Costeff et al.

(10) Patent No.: US 12,265,713 B2
(45) Date of Patent: Apr. 1, 2025

(54) SCHEDULING STORAGE TASKS

(71) Applicant: VAST DATA LTD., Tel Aviv (IL)

(72) Inventors: Hillel Costeff, Tel Aviv (IL); Asaf Levy, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 535 days.

(21) Appl. No.: 17/453,821

(22) Filed: Nov. 5, 2021

(65) Prior Publication Data

US 2023/0141122 A1  May 11, 2023

(51) Int. Cl.
*G06F 3/06* (2006.01)
*G06F 9/48* (2006.01)
*G06F 9/50* (2006.01)

(52) U.S. Cl.
CPC .......... *G06F 3/0631* (2013.01); *G06F 3/0604* (2013.01); *G06F 3/0656* (2013.01); *G06F 3/0659* (2013.01); *G06F 3/0679* (2013.01); *G06F 9/4881* (2013.01); *G06F 9/5027* (2013.01); *G06F 2209/485* (2013.01); *G06F 2209/5022* (2013.01)

(58) Field of Classification Search
None
See application file for complete search history.

(56) References Cited

U.S. PATENT DOCUMENTS

| | | | |
|---|---|---|---|
| 10,114,754 B1* | 10/2018 | Pendharkar | G06F 12/12 |
| 11,003,491 B1* | 5/2021 | Gasser | H04L 41/147 |
| 11,314,547 B1* | 4/2022 | Tang | H04L 67/1097 |
| 2016/0085674 A1* | 3/2016 | Sterns | G06F 12/0804 |
| | | | 711/143 |
| 2021/0209029 A1* | 7/2021 | Jakkula | G06F 12/127 |
| 2022/0179585 A1* | 6/2022 | Muthiah | G06F 3/0673 |
| 2023/0164078 A1* | 5/2023 | Li | H04L 47/12 |
| | | | 370/235 |

OTHER PUBLICATIONS

T. Lee, M. Lee and Y. I. Eom, "Alleviating I/O Interference in Virtualized Systems With VM-Aware Persistency Control," in IEEE Access, vol. 9, pp. 89263-89275, 2021 (Year: 2021).*

* cited by examiner

*Primary Examiner* — Frank D Mills
(74) *Attorney, Agent, or Firm* — Reches Patents (57) ABSTRACT

A method for managing tasks in a storage system, the method may include: (a) obtaining, by a scheduler, a shared budget for background storage tasks and foreground storage tasks; (b) obtaining, by the scheduler, a background budget for background storage tasks; wherein the background budget is a fraction of the shared budget; (c) allocating, by the scheduler, resources to pending storage tasks according to the shared budget and the background budget; wherein the allocating comprises (i) allocating the shared budget while prioritizing foreground storage tasks over background storage tasks; and (ii) allocating the background budget to background storage tasks; and (d) participating, by the scheduler, in executing of storage tasks according to the allocation.

23 Claims, 4 Drawing Sheets

SCHEDULING STORAGE TASKS

TECHNICAL FIELD

The present disclosure generally relates to the field of data storage, and more particularly to scheduling storage tasks.

BACKGROUND

Scheduling is the function that is carried out by a scheduler module that executes tasks according to computing resources assigned to the tasks. Scheduling enables multitasking with a single central processing unit (CPU).

The scheduler aims to fairness by assigning computing time to all tasks that are waiting for computing resources, according to priorities and computing workloads on different tasks.

There are two principal types of multitasking scheduling: cooperative multitasking and preemptive multitasking. Preemptive multitasking is a scheduling scheme where the scheduler initiates a context switch, that interrupts the executing task for the sake of executing other waiting tasks. Cooperative multitasking is a multitasking scheduling in which the running tasks voluntarily yield control periodically, or when idle, or when waiting for resources other than computing resources. Generally, tasks in a preemptive multitasking are called threads, while tasks in a cooperative multitasking are called fibers.

When considering scheduling in a storage system, additional factors, other than priorities and processing workload should be taken into account, such as the overall performance of the storage system.

SUMMARY

There may be provide a storage system, a method and a non-transitory computer readable medium for scheduling storage tasks.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

There are provided systems, methods and non-transitory computer readable medium for scheduling storage tasks.

The storage system may employ one or more schedulers. For simplicity of explanation the following text may refer to a single scheduler.

The scheduler schedules an execution of storage tasks of two main categories—foreground tasks and background tasks.

Foreground tasks—are related to ingest activities performed in response to IO requests received from client computers that are coupled to the storage system. For example: reading data for responding to read requests, storing data of write requests in non-volatile temporary storage (such as write buffers), storing updated metadata related to clients' requests in non-volatile storage, and responding to a client request, e.g., by sending an acknowledge to approve execution of an IO (mainly write) request or another command, or by sending a message containing a content requested by a client request.

Background tasks—are tasks that does not influence the latency of responses to clients' requests and are executed only after the received clients' data is safely stored and acknowledged. Background tasks may be related to preparing the temporarily stored data (stored by the foreground tasks) for permanent storage, including evacuating data from the temporary storage, striping the data into RAID stripes, data reduction, encryption, and the like, and finally storing the data in the permanent storage of the storage system. Background tasks may be also related to maintenance activities, such as garbage collection, defragmentation, various scrubbing operations for inspecting errors and data integrity, etc.

The foreground tasks are characterized by having a high priority, since they influent the performance as viewed by the clients accessing the storage system, mainly in terms of latency, throughput (IOPS—IO per second) and bandwidth (amount of data per second). The background tasks do not directly influent the latency, but these tasks can be heavy consumers of processing resources, since they execute complicated algorithms.

Even though background tasks have lower priority than foreground tasks, background tasks should not be starved since the evacuation of non-volatile storage that temporarily stores received data is performed by background tasks, and starvation of these tasks can harm the ability of the foreground tasks to receive new data.

The storage tasks may be implemented as fibers in a cooperative multitasking environment, or as other execution units in other multitasking environments.

A scheduler of the storage system may manages two types of task queues: one type for foreground tasks and another type for background tasks. There may be more than one queue per type. For simplicity of explanation the following will refer to a foreground task queue and to a background queue.

The scheduling is performed in cycles. Upon the beginning of each cycle, a computing budget is allocated for each type of tasks.

There are two types of budgets. A shared budget is assigned to both foreground tasks and background tasks to be used during the current cycle. For example, 500 usec (microseconds) is assigned as the shared budget to be used by both types of tasks. In addition, a background task budget is assigned to background tasks only. The background task budget is substantially lower than the shared budget, and may be for example, one tenth, one percent, or even less, e.g., 3 usec.

Foreground tasks gets priority over the background tasks, in the sense that as long as there are foreground tasks waiting for CPU resources and the shared budget is not exhausted, background tasks will not be executed.

When there are no foreground tasks that need CPU resources, or when the shared budget is exhausted—the scheduler will attempt to allow background tasks to execute. The background tasks will first use the background budget, and only when the background budget is exhausted, the shared budget will be used, if still not totally consumed.

If foreground tasks are queued in the execution queues after one or more background tasks have been executed, and there is still shared budget, the newly queued foreground tasks will be executed, before any further background tasks.

The execution cycle may end when there are no more budget to support any pending tasks or when there are no pending tasks. For example—when the shared budget is exhausted while there are only foreground tasks waiting to execute. Yet for another example—when both the shared budget and the background budget are exhausted while there are still foreground and/or background tasks waiting to execute.

A new cycle is then started. The budgets may be reassigned. The reassigning may be done regardless of any remainder from the previous cycle, i.e., any budget remainder is reset.

The shared budget and the prioritization of foreground tasks execution, allows the foreground tasks to consume most of the compute resources when there is a heavy foreground workload (e.g., large number of received IO requests), and thus—facilitating maintaining the low latency that is experienced by the client computers. The background budget allows avoiding choking of the background tasks even upon heady foreground workload, when at least a small amount (e.g., 1%) of the total budget is reserved for background tasks.

The shared budget further allows background tasks to benefit from the non-used shared budget, when there is a light foreground workload, allowing to catch up on background operations that may be delayed when the foreground workload was elevated.

Using the relatively short scheduling cycles allows reinforcement of the scheduling rules and fast adjustments of computing resource allocation in response to fast workloads changes.

The system may further implement polling tasks, called polling entities that poll events resulted from completion of various operations, resources that becomes available, responses from storage devices. Various tasks may become suspended or non-active when waiting to occurrence of those events. Examples of such events may include: received messages from communication sockets, responses from the storage devices or from RPC, locks or semaphores that become freed, etc.

When a polled event is detected by a polling entity, the polling unit may cause a conditional task that is waiting for the event to be queued on one of the execution queues.

At least once per execution cycle, the polling units will be monitored for detected events that may cause queueing of conditional tasks. If the monitoring of the polling units causes one or more conditional tasks to be queued for execution, and the corresponding budget is not exhausted, then the conditional tasks will be executed until the budget is exhausted or no more tasks to execute. The conditional tasks may be either foreground or background tasks.

The storage system includes multiple compute nodes, where each compute node includes multiple computing entities (processing core, CPU, GPU, or any king of processing unit). Each computing entity has its own scheduler that executes the scheduling mechanism described above.

The non-volatile storage that is used for temporarily storing received data in write buffers is constantly being monitored for the amount of free space that is left for storing newly received data. The amount of free space may be determined according to the amount of free write buffers in the system, or the total amount of free space in the write buffers of the system. Alternatively, the write buffers may be sharded into groups of write buffers, wherein each compute entity is assigned with one or more groups of write buffers. In the latter case, each group is monitored for the amount of free space in the group. When the amount of free space (of the write buffers or of one or more group of write buffers) drops below a free space threshold, it means that the background tasks evict stored data slower than the pace of storing newly received data by the foreground tasks. This may happen when there is a load on the foreground tasks that causes the shared budget during multiple execution cycles to be used mainly by foreground tasks. In order to avoid exhaustion of the free space, the system employs a back-pressure mechanism, by sending an event to at least one or all of the computing entities of the storage system, notifying to restrain execution of the foreground tasks, for example by: increase the budget of the background tasks, or to suspend all the foreground tasks, until the free space is elevated above a second threshold. The event may be sent to all the compute entities, since all the compute entities may have foreground tasks that write new data to any of the write buffers.

The duration of the suspension of the foreground tasks or the increment of the budget of the background tasks is calculated by a function that is based on the amount of free space left in the entire system, or the amount of free space that is left in a group of write buffers, for example, the amount of free space in the group having the lowest amount of free space.

When an execution cycle is ended, the remainder of the budget can serve as an indication of the amount of computing resources that has been consumed by the computing entity. For example, if the assigned shared budget is 500 usec and assigned background budget is 3 usec, and at the end of the cycle, 251 usec of the total budget is left—it means that the compute load on the computing entity is 50%. If no budget is left, it means that the compute entity is 100% occupied. If the budget remainder exceed a budget remainder threshold, or if the calculated compute load exceed a compute load threshold for a certain number of cycles, then a certain amount of workload (tasks) can be relocated to a different computing entity.

Figure 1:
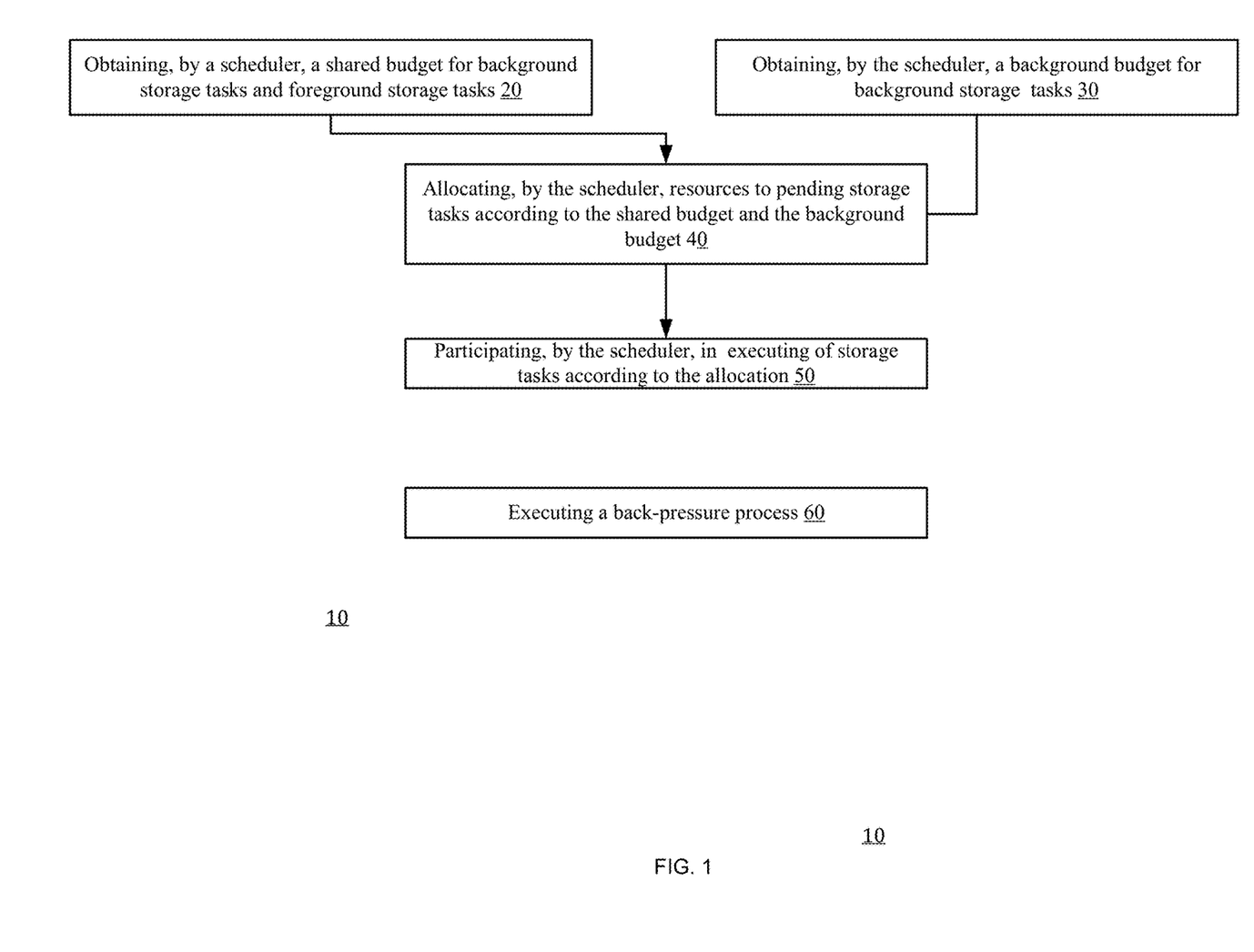
FIG. 1 is an example of a method.

FIG. 1 is an example of method 10 for managing tasks in a storage system.

Method 10 may start by steps 20 and 30.

Step 20 may include obtaining, by a scheduler, a shared budget for background storage tasks and foreground storage tasks.

Step 30 may include obtaining, by the scheduler, a background budget for background storage tasks. The background budget is a fraction (for example between 10-90 percent or 20-80 percent or 30-70 percent, or less than 50, 45, 40, 35, 30, 25, 20, 15, 10, 8, 7, 6, 5, 4, 3, 2, 1 percent, or less than 1 percent) of the shared budget.

Obtaining may include receiving or determining.

Steps 20 and 30 may be followed by step 40 of allocating, by the scheduler, resources to pending storage tasks according to the shared budget and the background budget. The allocating may include dequeuing a pending storage task from the corresponding pending task queue, so that the pending task becomes an executing task that consumes the resources.

Step 40 may include allocating the shared budget while prioritizing foreground storage tasks over background storage tasks. For example, pending foreground tasks are executed and benefit from the shared budget, before background tasks are executed on the expense of the shared budget.

Step 40 may include allocating the background budget to background storage tasks. For example, pending background tasks are executed on the expense of the background budget.

Step 40 may include exhausting the background allocation before allocating the shared budget for executing a background storage task.

Step 40 may include prioritizing allocating the shared budget for executing pending foreground storage tasks over allocating the background budget for executing pending background storage tasks.

Step 40 may be followed by step 50 of participating, by the scheduler, in executing of storage tasks according to the allocation.

Step 50 may include executing storage tasks, executing only a part of one or more of the storage tasks, triggering an execution of one or more of the storage tasks, requesting an execution of one or more tasks, instructing an execution of one or more tasks, monitoring progress of one or more tasks, outputting information regarding the allocation, outputting information regarding a usage of one or more budget of the shared budget and the background budget, outputting information regarding a relationship between used budget and a sum of the background budget and the shared budget. The outputted information may indicate the load on the compute entity and may facilitate load balancing, that may be triggered when the used (consumed) budget exceeds a certain threshold, or when the relationship between used budget and the total budget (background budget and the shared budget) exceeds a certain threshold.

Step 50 may be performed by accessing pending background storage tasks that are queued in one or more background queues and/or accessing pending foreground storage tasks that are queued in one or more foreground queues. The accessing may include dequeuing the pending tasks. The foreground queues may include multiple queues of different priorities and the background queues may include multiple queues of different priorities. Step 50 may include selecting the next pending task to be executed, according to the allocation of step 40 and according to other considerations, such as priorities among the foreground queues or among the background queues, and dequeuing the selected next pending task.

Steps 20, 30, 40 and 50 may be executed multiple times. Each repetition of steps 20, 30, 40 and 50 may be regarded as a cycle.

Steps 20 and/or 30 of one cycle may be executed regardless of any remaining budget from a previous cycle.

Cycles may be executed by a set of schedulers—and each scheduler may execute multiple cycles. The schedulers of the set may execute the cycles—for example independently from each other. Other processes such as a back-pressure process may affect multiple schedulers.

The set may include any number of schedulers. It may include all or only some of the schedulers of the storage system.

A scheduler may be associated with one or more unique compute resources of the storage system. For example—different schedulers may be associated with different compute entities—such as different compute nodes or different compute cores within a compute node. In this sense each scheduler performs a local scheduling.

For example—a compute entity of a storage system may include one or more schedulers for managing the tasks allocated to the compute entity. A compute entity may be a compute core, a compute node and the like. A compute entity may include one or more processing circuits. The allocation of tasks to compute entities can be made in any manner—for example on a shard basis, can be made by one or more dedicated allocation unit, can be made in cooperation between compute entities, and the like.

Method 10 may include step 60 of executing a back-pressure process. Step 60 may include at least one out of (a) selectively updating the background budget, (b) selectively updating the shared budget, and (c) changing a manner of the executing of the storage tasks. Step 60 may include any other measures for restraining the execution of the foreground tasks.

Step 60 may be executed per one or more cycles.

Step 60 may include changing a manner of execution by temporarily pausing an execution of foreground tasks. This will increase the execution time of the background tasks.

The back-pressure process is responsive to a status of one or more groups of non-volatile write buffers of the storage system. The status may be received or obtained by the scheduler. The group may include at least one non-volatile write buffer. While some foreground tasks may fill one or more non-volatile write buffers, some background processes may empty the one or more non-volatile write buffers. The back-pressure process may be set to balance between the filling and emptying of the non-volatile write buffers.

The status may be indicative of a fullness level of the one or more groups of non-volatile write buffers.

The status may be indicative of a change over time of a fullness level of the one or more groups of non-volatile write buffers. The status may be received by the scheduler when the fullness level has exceeded one or more thresholds (or when the free space has dropped below one or more free space thresholds), or when a change over time of a fullness level has exceeded a certain threshold.

The back pressure process may be global (across the entire storage system) or more local (across only one or more parts of the storage system) in the sense that it looks at the state of nonvolatile write buffers that can be accessed by multiple unique resources—associated with two or more schedulers.

For example—the back-pressure process may be responsive to a status of one or more groups of non-volatile write buffers (for example the fullness of a group of non-volatile write buffers allocated to a shard of a background task, where a background task for migrating data from the non-volatile write buffers is sharded across compute entities, and each shard is assigned with one or more groups of non-volatile write buffers), wherein the one or more groups of nonvolatile write buffers are accessed by compute resources associated with different schedulers.

Assuming that different groups are allocated to different shards—the status of one or more of said groups—or any function applies of statuses of one or more groups may be used for determining the back pressure step to take. For example—having the back pressure process respond to the fullness of the group that is the fullest among all the groups.

Step 60 may include modifying an operation of multiple schedulers. For example—changing an allocation of budgets.

Figure 2:
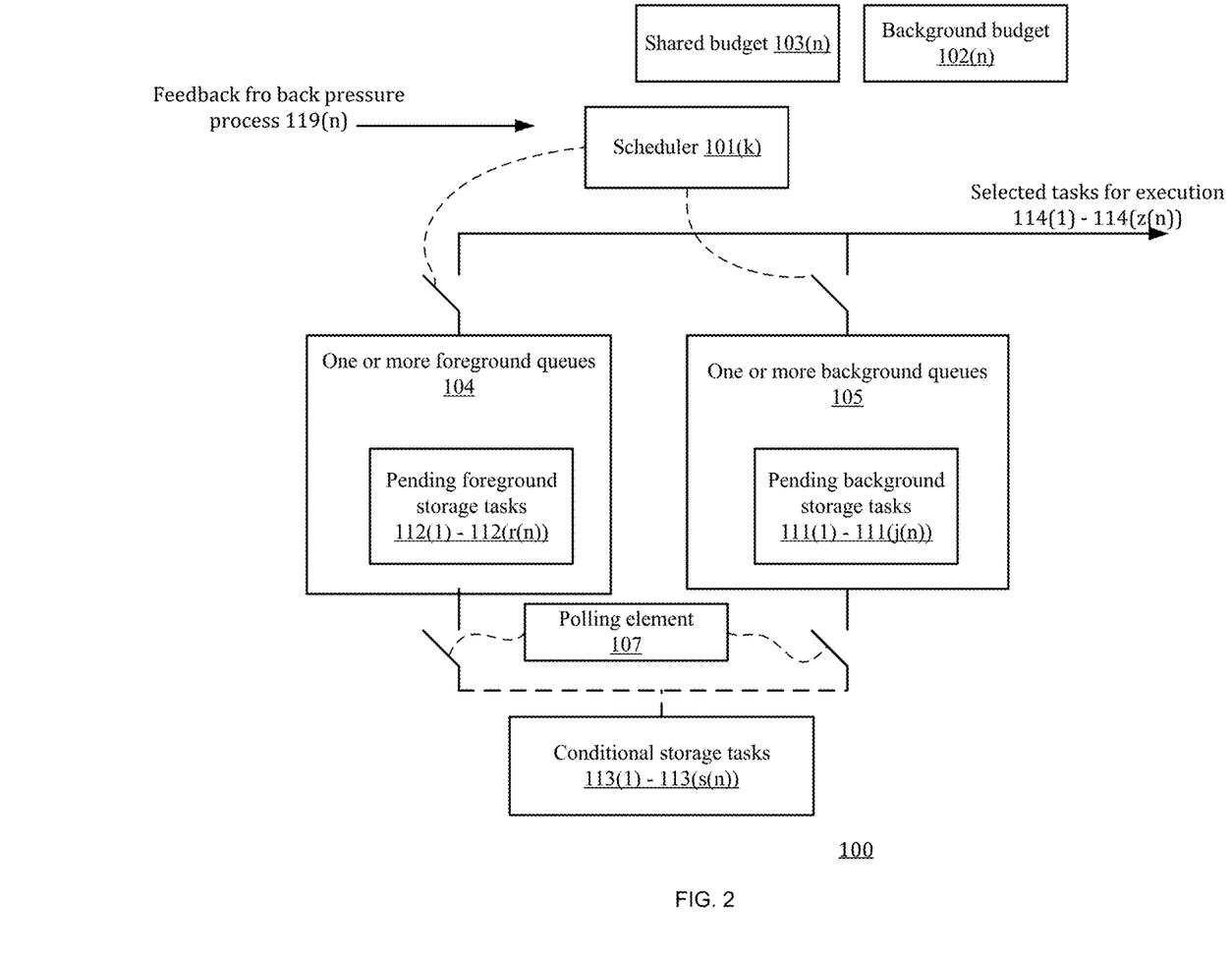
FIG. 2 is an example of a scheduler and its environment.

FIG. 2 illustrates an example of a scheduler 101(k), its environment and various data structures during a n'th cycle. Indexes n, k, z(n), j(n), and r(n)) are positive integers.

Index z(n) is the number of tasks 114 selected for execution during the n'th cycle.

Index j(n) is the number of background storage tasks 111 queued in one or more background queues 105 during the n'th cycle.

Index r(n) is the number of foreground storage tasks 112 queued in one or more foreground queues 104 during the n'th cycle.

The scheduler 101(k) is configured to obtain the shared budget 103(n) for the n'th cycle, obtain the background budget 102(n) for the n'th cycle, may receive feedback 119(n) from the back pressure—for the n'th cycle (which may affect any one of the budgets, may affect the allocation of the budget and/or the selected tasks for execution)—and may select the tasks for execution—according to allocation rules.

The queueing of conditional storage tasks to either one of the one or more foreground queues 104 or the one or more background queues 105 may be determined based on fulfillment of conditions (see condition polling unit 107).

Figure 3:
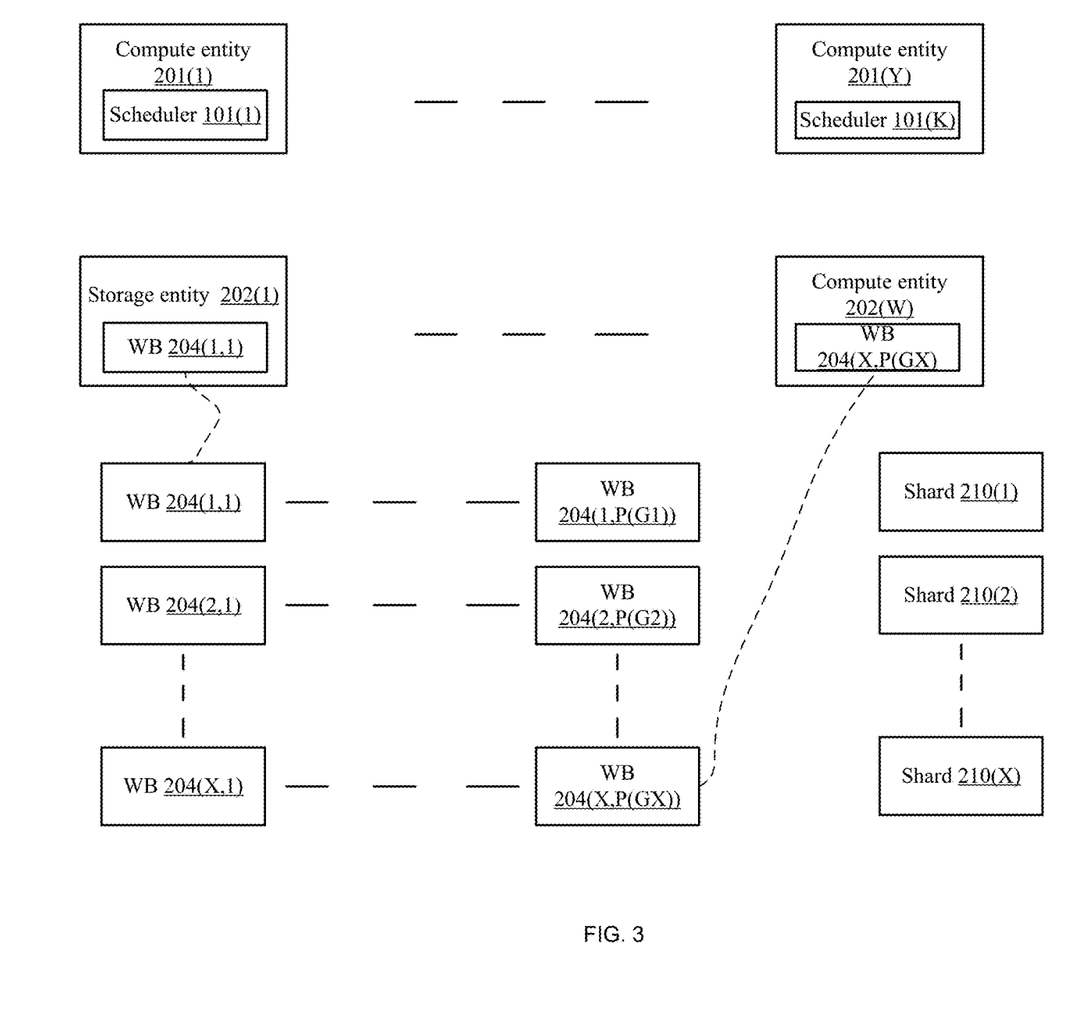
FIG. 3 illustrates compute entities, storage entities and write buffers.

FIG. 3 is an example of compute entities 201(1)-201(Y), schedulers 101(1)-101(K), storage entities 202(1)-202(W), and write buffers WB 204(1,1)-204(X,P(GX)).

Y, K, W, X and P(G1) till P(BX) are positive integers. The values of one or more of Y, K, W, X and P(G1) till P(BX) may change over time.

Y may differ from K or may equal to K—as there may be any relationship between compute entities and schedulers (one or more schedulers per a certain compute element, no scheduler in a certain compute element, and the like).

There are X groups of write buffers—G1 till GX—having P(G1) till P(GX) members respectively. The groups may be defined in any manner—for example one group per shard (out of shards 210(1) till 210(X).

A back pressure process may review the status (for example fullness level, changes over time of fullness levels) of one, some or all the write buffers and selectively (when necessary—based on the status) affect the scheduler and/or the execution of tasks.

The determination of what to do during the back pressure process may depend on the status of one or more groups of write buffers.

Figure 4:
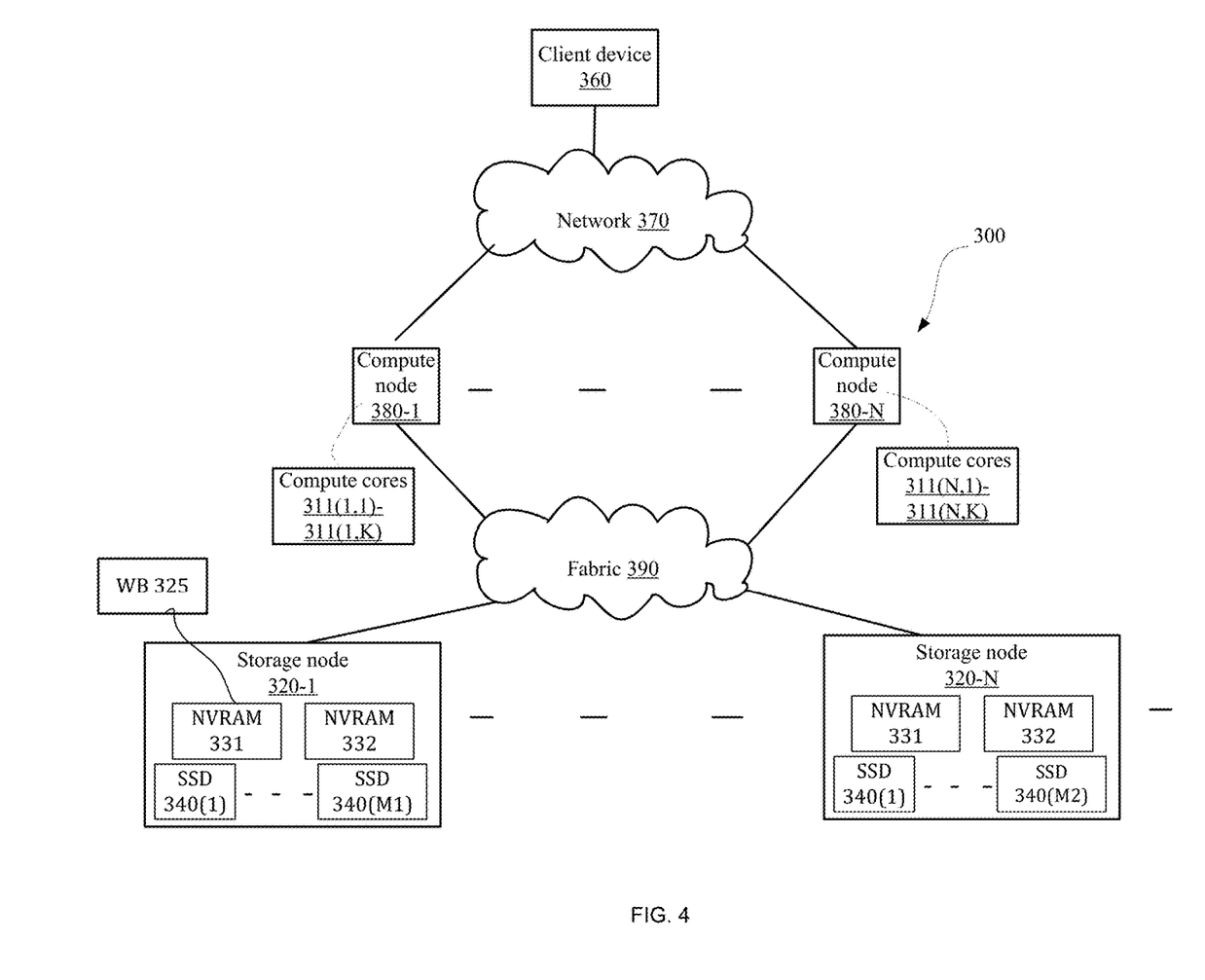
FIG. 4 is an example of a storage system.

FIG. 4 shows an example diagram of a storage system 300 according to the disclosed embodiments.

The storage system 300 includes a number of N compute nodes 380-1 through 380-N (hereinafter referred to individually as a compute node 380 and collectively as compute nodes 380, merely for simplicity purposes, N is an integer equal to or greater than 1). The compute nodes include (or may execute) multiple compute cores each—see for example compute cores 311(1,1)-311(1,K) and compute cores 311(N,1)-311(N,K).

The storage system 300 also includes a number of M storage nodes 320-1 through 320-M (hereinafter referred to individually as a storage node 320 and collectively as storage nodes 320, merely for simplicity purposes, M is an integer equal to or greater than 1). The computer nodes 380 and the storage nodes 320 are connected through a communication fabric 390. M may equal N or may differ from N.

In an embodiment, a compute node 380 may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 380 does not require any dedicated hardware A compute node 380 is configured to perform tasks related to the management of the storage nodes 320. In an embodiment, each compute node 380 interfaces with multiple client devices such as a client device 360. The compute nodes interface the clients via one or more networks, such as network 370. The network 370 may be, but is not limited to, the Internet, the world-wide-web (WWW), a local area network (LAN), a wide area network (WAN), and the like.

The compute nodes participate in executing the steps of method 10.

In an embodiment, to efficiently read and write data to the storage nodes 320 from the physical layer, each compute node 380 performs a number of processes including data reduction, data resiliency, and Flash memory management actions (e.g., defrag, wear leveling, and so on).

It should be noted that each compute node 380 may operate in the same manner as all other compute nodes 380. In a case of a failure, any compute node 380 can replace the failed node. Further, each compute node may control and manage one or mode storage nodes 320 regardless of the specific architecture of the storage nodes 320. Therefore, there is no coupling between specific compute nodes 380 and specific storage nodes 320. As such, compute nodes can be added to the system 300 without increasing the number of storage nodes (or their capacity), and vice versa, storage nodes can be added without increasing the number of compute nodes 380.

The storage nodes 320 provide the storage and state in the system 300. To this end, each storage node 320 may include a plurality of SSDs, such as SSDs 340, for example storage node 320-1 includes M1 SSDs 340(1)-340(M1). Each storage node further includes fast accessed memory for storing the traversal task queues, such as NVRAM 331 and 332 of FIG. 3. The traversal task queues may be stored in either a volatile memory or non-volatile memory within the storage node. An NVRAM may store one or more write buffers for storing content, by the foreground tasks, before it is migrated to the SSDs, by the background tasks. See for example write buffers WB 325 of NVERM 331.

The storage nodes 320 may be configured to have the same capacity as each other or different capacities from each other. In an embodiment, the data stored in each storage node 320 is made redundant internally within the storage node, made redundant at a different storage node, or both.

A storage node 320 may be configured to communicate with the compute nodes 380 over the communication fabric 390. It should be noted that each compute node 380 can communicate with each storage node 320 over the communication fabric 390. There may not be a direct coupling between a compute node 380 and storage node 320.

In the embodiment, the communication fabric 390 may include an Ethernet fabric, an InfiniBand fabric, and the like. Specifically, the communication fabric 390 may enable communication protocols such as, but not limited to, remote direct memory access (RDMA) over Converged Ethernet (RoCE), iWARP, Non-Volatile Memory Express (NVMe), and the like. It should be noted that the communication protocols discussed herein are provided merely for example purposes, and that other communication protocols may be equally utilized in accordance with the embodiments disclosed herein without departing from the scope of the disclosure.

It should be noted that in one example deployment, the client device 360 is part of a compute node 380. In such a deployment, the system 300 does not communicate with an external network, e.g., the network 370. It should be further noted that the communication between the compute nodes 380 and the storage nodes 320 is facilitated over the fabric 390. It should be further noted that the compute nodes 320 can communicate with each other over the fabric 390. The fabric 390 is a shared fabric.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof

What is claimed is:

1. A method for managing execution of tasks on a processing circuit of a storage system, the method comprising:
   (a) obtaining, by a scheduler that is executed by a hardware processing unit of a compute node of the storage system, a shared budget for executing background storage tasks and foreground storage tasks that are allocated to the hardware processing unit;
   (b) obtaining, by the scheduler, a background budget for executing the background storage tasks; wherein the background budget is a fraction of the shared budget;
   (c) allocating, by the scheduler, compute resources of the hardware processing unit to pending storage tasks according to the shared budget and the background budget; wherein the allocating comprises (i) allocating the shared budget while prioritizing foreground storage tasks over background storage tasks; and (ii) allocating the background budget to background storage tasks;
   (d) executing, by at least one computing resource of the hardware processing unit, the pending storage tasks, according to the allocation;, by performing at least one of: (i) a foreground task of storing data of received write requests in non-volatile write buffers of hardware storage nodes of the storage system that communicate with the compute node over one or more networks, (ii) a background task of evicting data from the non-volatile write buffers, and (iii) a background task of storing the data in a permanent storage of the storage system; and
   (e) increasing, by the scheduler, the background budget, allocating at least one additional computing resource of the hardware processing unit in response to the increasing, and executing the background tasks by using the at least one additional computing resource, when a current pace of evicting the data from the write buffers is slower than a current pace of storing the data in the write buffers.

2. The method according to claim 1 wherein the allocating comprises exhausting the background allocation before allocating the shared budget for executing a background storage task.

3. The method according to claim 1 wherein the allocating comprises prioritizing allocating the shared budget for executing pending foreground storage tasks over allocating the background budget for executing pending background storage tasks.

4. The method according to claim 1 comprising performing multiple repetitions of steps (a)-(d) to form multiple execution cycles.

5. The method according to claim 4 comprising ignoring, during one execution cycle, any budget unused in a previous execution cycle.

6. The method according to claim 1 comprising queuing pending background storage tasks in one or more background queues and queuing pending foreground storage tasks in one or more foreground queues.

7. The method according to claim 1 comprising outputting information about the allocation.

8. The method according to claim 1 comprising outputting information regarding a usage of one or more budget of the shared budget and the background budget.

9. The method according to claim 1 comprising outputting information regarding used budget and a sum of the background budget and the shared budget.

10. The method according to claim 1 comprising instructing one or more resources of the storage system to execute the storage tasks according to the allocation.

11. The method according to claim 1 comprising performing, by a set of schedulers executed by hardware processing units of the compute node, multiple repetitions of steps (a)-(d) to form multiple sets of execution cycles.

12. The method according to claim 1 wherein a duration of the scheduling does not exceed 500 microsconds, wherein an execution of a background task does not influence a latency of responses to client requests aimed to the storage system and an execution of a foregound task defines the latency of responses to client requests aimed to the storage system.

13. The method according to claim 11 comprising performing a back-pressure process for performing at least one out of (i) selectively updating the background budget, (ii) selectively updating the shared budget, and (iii) changing a manner of the executing of the storage tasks.

14. The method according to claim 13 wherein the changing comprises temporarily pausing an execution of foreground tasks.

15. The method according to claim 13 wherein the back-pressure process is responsive to a status of one or more groups of non-volatile write buffers of the storage system, wherein a group comprises at least one non-volatile write buffer.

16. The method according to claim 15 wherein the status is indicative of a fullness level of the one or more groups of non-volatile write buffers.

17. The method according to claim 15 wherein the status is indicative of a change over time of a fullness level of the one or more groups of non-volatile write buffers.

18. The method according to claim 13 wherein the back-pressure process is responsive to a status of one or more groups of non-volatile write buffers, wherein the one or more groups of non-volatile write buffers are accessed by compute resources associated with different schedulers.

19. The method according to claim 13 wherein the backpressure process comprises modifying an operation of multiple schedulers.

20. The method according to claim 1 wherein the storage tasks comprise one or more conditional storage tasks, wherein an execution of a conditional storage task is conditioned by a condition;
wherein the method comprises checking a fulfillment of one or more conditions of the one or more conditional storage tasks; and
updating one or more status of the one or more conditional storage tasks based on an outcome of the checking.

21. The method according to claim 20 wherein the checking and updating is executed during each repetition of steps (a)-(d).

22. A non-transitory computer readable medium that stores instructions for:
(a) obtaining, by a scheduler that is executed by a hardware processing unit of a compute node of a storage system, a shared budget of computing resources for executing background storage tasks and foreground storage tasks that are allocated to the hardware processing unit;
(b) obtaining, by the scheduler, a background budget of computing resources for executing the background storage tasks; wherein the background budget is a fraction of the shared budget;
(c) allocating, by the scheduler, compute resources of the hardware processing unit to pending storage tasks according to the shared budget and the background budget; wherein the allocating comprises (i) allocating the shared budget while prioritizing foreground storage tasks over background storage tasks; and (ii) allocating the background budget to background storage tasks;
(d) executing by at least one computing resource of the hardware processing unit, the pending storage tasks, according to the allocation, by performing at least one of:
(i) a foreground task of storing data of received write requests in non-volatile write buffers of hardware storage nodes of the storage system that communicate with the compute node over one or more networks, (ii) a background task of evicting data from the non-volatile write buffers, and (iii) a background task of storing the data in a permanent storage of the storage system; and
(e) increasing by the scheduler, the background budget, allocating at least one additional computing resource of the hardware processing unit in response to the increasing, and executing the background tasks by using the at least one additional computing resource, when a current pace of evicting the data from the write buffers is slower than a current pace of storing the data in the write buffers.

23. A storage system that comprises storage nodes; and
compute nodes that comprises hardware processing units;
wherein a hardware processing unit of a compute node of the compute nodes is configured to host a scheduler;
wherein the scheduler is configured to:
(a) obtain a shared budget of computing resources for executing background storage tasks and foreground storage tasks that are allocated to the hardware processing unit;
(b) obtain a background budget of computing resources for executing the background storage tasks; wherein the background budget is a fraction of the shared budget;
(c) allocate compute resources of the hardware processing unit to pending storage tasks according to the shared budget and the background budget;
wherein the allocating comprises (i) allocating the shared budget while prioritizing foreground storage tasks over background storage tasks; and (ii) allocating the background budget to background storage tasks;
wherein at least one computing resource of the hardware processing unit, are configured to execute the pending storage tasks, according to the allocation, by performing at least one of: (i) a foreground task of storing data of received write requests in non-volatile write buffers of hardware storage nodes of the storage system that communicate with the compute node over one or more networks, (ii) a background task of evicting data from the non-volatile write buffers, and (iii) a background task of storing the data in a permanent storage of the storage system;
wherein the scheduler is further configured to increase the background budget, and toallocate additional computing resources in response to the increased background badget, and
wherein one or more computing resources of the hardware processing unit are further configured to execute the background tasks by using the additional compute resources, when a current pace of evicting the data from the write buffers is slower than a current pace of storing the data in the write buffers.

* * * * *